J. NAZEL.
APPARATUS FOR COATING ARTICLES.
APPLICATION FILED FEB. 24, 1909.

1,056,291.

Patented Mar. 18, 1913.

2 SHEETS—SHEET 1.

J. NAZEL.
APPARATUS FOR COATING ARTICLES.
APPLICATION FILED FEB. 24, 1909.

1,056,291.

Patented Mar. 18, 1913.

2 SHEETS—SHEET 2.

WITNESSES:

INVENTOR

ATTORNEY.

UNITED STATES PATENT OFFICE.

JOHN NAZEL, OF PHILADELPHIA, PENNSYLVANIA.

APPARATUS FOR COATING ARTICLES.

1,056,291.  Specification of Letters Patent.  Patented Mar. 18, 1913.

Application filed February 24, 1909. Serial No. 479,743.

*To all whom it may concern:*

Be it known that I, JOHN NAZEL, of the city of Philadelphia, county of Philadelphia, and State of Pennsylvania, have invented certain Improvements in Apparatus for Coating Articles, of which the following is a specification.

My invention relates to apparatus for coating articles such as paper receptacles, and its leading purpose is to provide simple and efficient mechanism for automatically charging, engaging, carrying, dipping, drying and delivering such articles.

The characteristic features of my improvements are fully disclosed in the following description and the accompanying drawings in illustration thereof.

Figure 1:
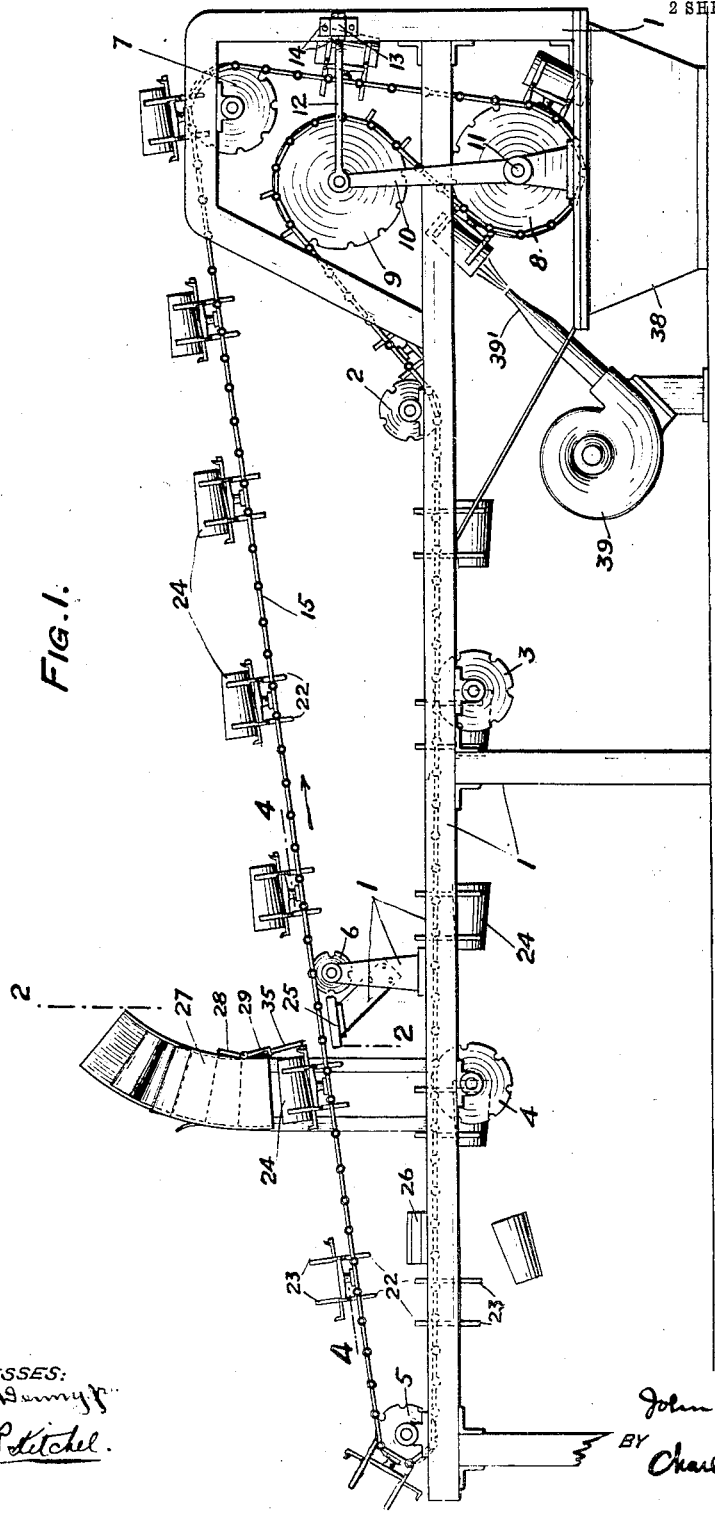
Figure 2:
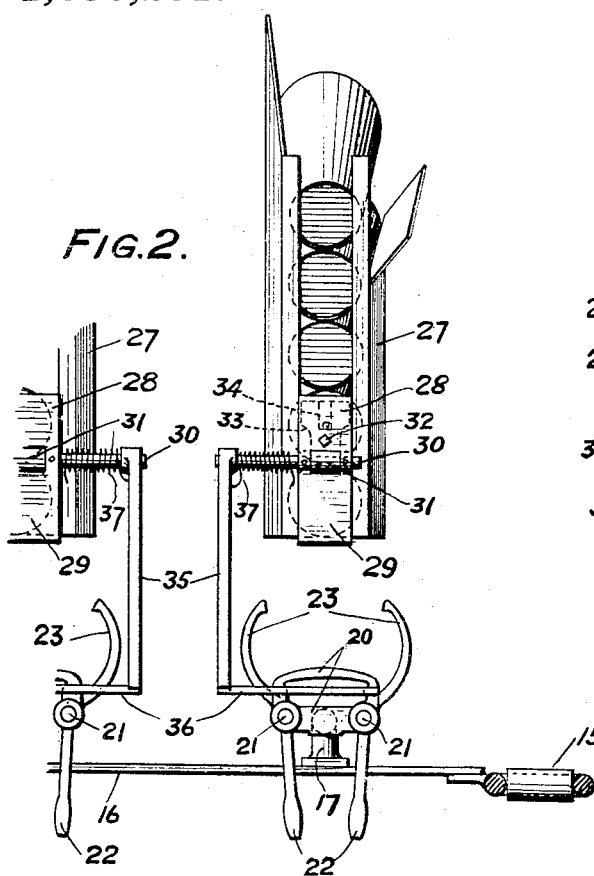
Figure 3:
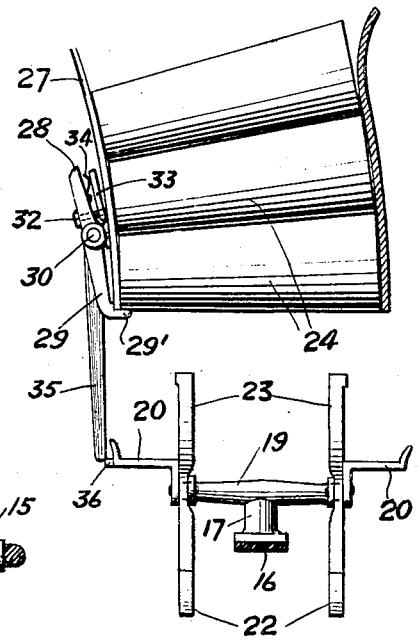
Figure 4:
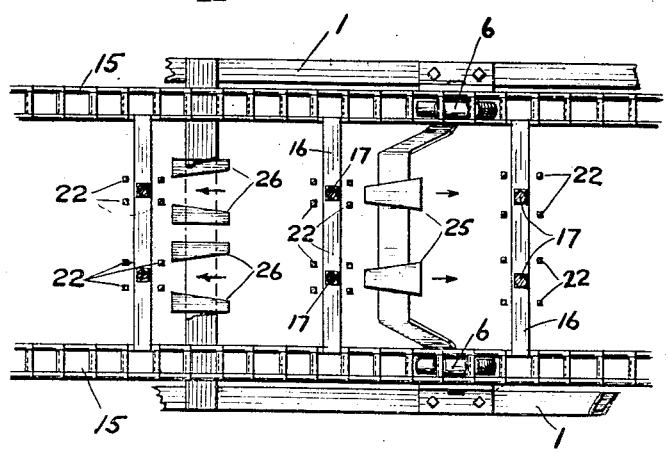

In the drawings, Figure 1 is a side elevation of apparatus embodying my improvements; Fig. 2 is an enlarged partial sectional view taken on the line 2—2 of Fig. 1; Fig. 3 is a sectional side elevation of part of the construction shown in Fig. 2; and Fig. 4 is a partial sectional plan view of the traveling carrier mechanism and cams coacting therewith taken on the line 4—4 of Fig. 1.

The apparatus, as shown in the drawings, comprises the frame 1 having journaled thereon the sheaves or sprocket wheels 2, 3, 4, 5, 6, 7, 8, and 9. The wheels 9 are adjustable in position by means of angular frame members comprising the struts 10 adapted to rock on the bearings 11 and arms 12 engaged in adjustable relation to keepers 13 by nuts 14, whereby may be adjusted the tension of a belt or sprocket chains carried by the wheels. Sprocket chains 15 are carried by the sprocket wheels and are connected by the cross bars 16, forming a traveling belt. Fixed on the cross bars 16 are the studs 17 and fixed on the studs are the spindles 19 which carry on the ends thereof the brackets 20. The respective brackets have connected therewith, by the journals 21, levers, comprising the arms 22 and 23, forming tongs, the arms 23 being curved to form jaws adapted for holding the receptacles 24. Cams 25 are supported by the frame, beneath the upper inclined section of the belt, in position to be engaged by and spread the arms 22 to close the jaws 23 of the tongs. Cams 26 are supported by the frame and act on the arms 22 to move them toward each other, spreading the jaws 23 to open the tongs.

Magazines, comprising the chutes 27, are disposed above and in the vertical planes of the respective sets of tongs. Each magazine has at a side of its lower end a broad lever, comprising the arms 28 and 29 carried by a shaft 30 journaled in a bearing 31. The upper arm 28 has connected within it, by a movable bolt 32, a movable plate 33 bearing against a spring 34 which is supported by the arm. A projection 29' extends inwardly from the lower end of the arm 29. An arm 35 is fixed on the end of each shaft 30, in the path of an arm 36 carried by the forward bracket 20 of each receptacle holder. The arms 36 act on the arms 35 to withdraw the projections 29' from their engagements with the lowermost receptacles 24, permitting the receptacles to drop into holders beneath them and simultaneously the plates 33 are pressed against the bottoms of the next receptacles 24 to hold them in the chutes. Coiled springs 37, on the respective shafts 30, have their inner ends fixed to the corresponding chutes 27 and their outer ends fixed to the arms 35, whereby the latter are restored to their normal positions, the plates 33 withdrawn from their engagements with the receptacles held thereby and the projections 29' moved into position to stop the descent of the released receptacles 24 at the bottom of the chutes.

A tank 38, adapted for holding a coating liquid, is placed beneath the wheels 8 at the bottom of the forward part of the frame and a fan 39 has a nozzle 39' disposed to blow in the direction of travel of the belt section extending from the wheel 8 to the wheel 9, in the plane of each set of receptacle holders.

The belt being caused to travel in the direction of the arrow (Fig. 1), as by applying power to the wheels 5, and the tongs being open, when the arms 36 strike the arms 35 receptacles 24 are permitted to drop into the chairs or holders formed by the brackets 20 and the jaws 23, and as the holders are carried forward the jaws are closed, so that the receptacles cannot drop therefrom, by the engagement of the arms 22 with the cams 25. A doube train of receptacles is thus delivered, engaged and carried over the wheels 6 and 7, under the wheels 8, through the coating solution in the tank 38, through the blast from the nozzles 39', over the wheels 9, and by way of the wheels 2, 3, and 4, and past the cams 26, which open the tongs and permit the receptacles to drop, coated and dried.

While the foregoing apparatus is designed primarily for use in coating articles, it will be understood that it is adapted to be used for passing articles through liquids for any purpose, or otherwise as a carrier simply.

Having described my invention, I claim:

1. In apparatus of the character described, a traveling belt, carriers fixed to said belt for holding receptacles thereon, a tank, means whereby said belt passes receptacles engaged by said carriers into and out of said tank, a magazine having mechanism for alternately holding and delivering receptacles, and means carried by said belt for operating said mechanism whereby receptacles are delivered to said carriers.

2. In apparatus of the character described, a set of traveling carriers adapted for holding articles, a chute having thereon a pivoted lever adapted for alternately engaging the ends of, and releasing tubular articles in said chute, and mechanism whereby said lever is operated and said articles are delivered to said carriers, said mechanism comprising a spring for holding said lever in its normal position and an arm operated by parts on said carriers for moving said lever against the action of said spring.

3. In apparatus of the character described, a traveling belt, on said belt a set of traveling carriers having movable jaws adapted for holding receptacles, a chute having thereon a fulcrumed lever with means for engaging successive receptacles alternately, an arm connected with said lever for operating it, means on said carriers for operating said arm whereby said lever is operated to release a receptacle from said chute and permit it to be delivered to a carrier, means for closing said jaws and holding said receptacles delivered to said carriers, a tank adapted for containing a liquid through which said carriers convey said receptacles, and means for opening said jaws to permit said receptacles to be delivered from said carriers.

In witness whereof I have hereunto set my name this 20th day of February, 1909, in the presence of the subscribing witnesses.

JOHN NAZEL.

Witnesses:
    Jos. G. Denny, Jr.,
    Robt. R. Kitchel.